(12) United States Patent
Liang

(10) Patent No.: US 10,531,082 B2
(45) Date of Patent: *Jan. 7, 2020

(54) PREDICTIVE LIGHT-FIELD COMPRESSION

(71) Applicant: GOOGLE LLC, Mountain View, CA (US)

(72) Inventor: Chia-Kai Liang, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,128

(22) Filed: Jun. 13, 2017

(65) Prior Publication Data

US 2017/0280136 A1 Sep. 28, 2017

Related U.S. Application Data

(63) Continuation of application No. 15/085,048, filed on Mar. 30, 2016, now Pat. No. 9,712,820, which is a
(Continued)

(51) Int. Cl.
*G06K 9/46* (2006.01)
*H04N 19/103* (2014.01)
(Continued)

(52) U.S. Cl.
CPC ....... *H04N 19/103* (2014.11); *G02B 27/0075* (2013.01); *H04N 19/147* (2014.11); *H04N 19/176* (2014.11); *H04N 19/597* (2014.11)

(58) Field of Classification Search
CPC .. H04N 19/103; H04N 19/147; H04N 19/176; H04N 19/597; G02B 27/0075
(Continued)

(56) References Cited

U.S. PATENT DOCUMENTS 5,907,619 A 5/1999 Davis
6,023,523 A 2/2000 Cohen et al.
(Continued)

OTHER PUBLICATIONS

Chang, C.L., et al., "Light Field Compression Using Disparity-Compensated Lifting and Shape Adaptation," IEEE Trans. Image Processing, vol. 15, No. 4, pp. 793-806, Apr. 2006. http://www.stanford.edu/~bgirod/pdfs/ChangZhuRamanathanTransIP2006.pdf.
(Continued)

*Primary Examiner* — Iman K Kholdebarin

(57) ABSTRACT

According to various embodiments, a light-field image may be compressed and/or decompressed to facilitate storage, transmission, or other functions related to the light-field image. A light-field image may be captured by a light-field image capture device having an image sensor and a microlens array. The light-field image may be received in a data store. A processor may generate a first refocus image pool with a plurality of refocus images based on the light-field image. The processor may further use the first refocus image pool to compress the light-field image to generate a bitstream, smaller than the light-field image, which is representative of the light-field image. The processor or a different processor may also be used to generate a second refocus image pool with a second plurality of images based on the bitstream. The second refocus image pool may be used to decompress the bitstream to generate a reconstructed light-field image.

19 Claims, 11 Drawing Sheets

Related U.S. Application Data continuation-in-part of application No. 14/261,144, filed on Apr. 24, 2014, now Pat. No. 9,414,087.

(60) Provisional application No. 62/148,061, filed on Apr. 15, 2015.

(51) Int. Cl.
    *H04N 19/176* (2014.01)
    *G02B 27/00* (2006.01)
    *H04N 19/597* (2014.01)
    *H04N 19/147* (2014.01)

(58) Field of Classification Search
    USPC .................................................. 382/232–233
    See application file for complete search history.

(56) References Cited

U.S. PATENT DOCUMENTS

| | | | |
|---|---|---|---|
| 6,091,860 A | 7/2000 | Dimitri | |
| 7,034,866 B1 | 4/2006 | Colmenarez et al. | |
| 7,792,423 B2* | 9/2010 | Raskar | G02B 27/0075 250/237 R |
| 7,936,377 B2 | 5/2011 | Friedhoff et al. | |
| 7,949,252 B1 | 5/2011 | Georgiev | |
| 8,103,111 B2* | 1/2012 | Horie | G02B 27/2214 382/232 |
| 8,155,456 B2 | 4/2012 | Babacan et al. | |
| 8,244,058 B1 | 8/2012 | Intwala et al. | |
| 8,279,325 B2* | 10/2012 | Pitts | H04N 5/23212 348/345 |
| 8,290,358 B1 | 10/2012 | Georgiev | |
| 8,581,929 B1* | 11/2013 | Maguire, Jr. | G06F 3/013 345/619 |
| 8,605,199 B2* | 12/2013 | Imai | H04N 5/23216 348/333.12 |
| 8,754,829 B2* | 6/2014 | Lapstun | H04N 13/0402 345/419 |
| 8,941,771 B2* | 1/2015 | Iwane | G06T 1/0007 348/340 |
| 9,106,784 B2* | 8/2015 | Lelescu | H04N 9/045 |
| 9,191,560 B2* | 11/2015 | Suzuki | H04N 5/2254 |
| 9,210,315 B2* | 12/2015 | Nakajima | H04N 5/23212 |
| 9,240,049 B2* | 1/2016 | Ciurea | H04N 13/232 |
| 9,712,820 B2* | 7/2017 | Liang | H04N 19/597 |
| 9,811,753 B2* | 11/2017 | Venkataraman | G06T 9/00 |
| 9,860,537 B2* | 1/2018 | Lawrence | H04N 19/14 |
| 2003/0123700 A1 | 7/2003 | Wakao | |
| 2005/0031203 A1 | 2/2005 | Fukuda | |
| 2007/0030357 A1 | 2/2007 | Levien et al. | |
| 2008/0018668 A1 | 1/2008 | Yamauchi | |
| 2008/0144952 A1* | 6/2008 | Chen | H04N 19/12 382/239 |
| 2008/0193026 A1 | 8/2008 | Horie et al. | |
| 2009/0185051 A1 | 7/2009 | Sano | |
| 2009/0268970 A1 | 10/2009 | Babacan et al. | |
| 2011/0129165 A1 | 6/2011 | Lim et al. | |
| 2011/0234841 A1 | 9/2011 | Akeley et al. | |
| 2012/0249550 A1* | 10/2012 | Akeley | H04N 5/232 345/419 |
| 2013/0093944 A1* | 4/2013 | Fukami | H04N 19/597 348/360 |
| 2015/0264313 A1* | 9/2015 | Bright-Thomas | H04N 7/15 348/14.08 |
| 2016/0173883 A1* | 6/2016 | Lawrence | H04N 19/14 348/46 |
| 2017/0178363 A1* | 6/2017 | Venkataraman | G06T 9/00 |

OTHER PUBLICATIONS

Chen, W., et al., "Light field mapping: Efficient representation and hardware rendering of surface light fields". ACM Transactions on Graphics 21, 3, 447-456, 2002.

Fattal, et al., "Gradient Domain High Dynamic Range Compression", ACM SIGGRAPH 2002.

Magnor, M., et al., "Model-Aided Coding of Multi-Viewpoint Image Data," Proc. IEEE International Conference on Image Processing, ICIP-2000, Vancouver, Canada, Sep. 2000. https://graphics.tu-bs.de/static/people/magnor/publications/icip00.pdf.

Magnor, M., et al., "Data Compression for Light-Field Rendering", IEEE Transactions on Circuits and Systems for Video Technology, vol. 10, Issue 3, pp. 338-343, Apr. 2000.

\* cited by examiner

PREDICTIVE LIGHT-FIELD COMPRESSION

CROSS-REFERENCE TO RELATED APPLICATIONS

The present application claims priority as a continuation of U.S. Utility application Ser. No. 15/085,048 for "Predictive Light Field Compression", filed Mar. 30, 2016, the disclosure of which is incorporated herein by reference in its entirety.

U.S. Utility application Ser. No. 15/085,048 claims the benefit of U.S. Provisional Application Ser. No. 62/148,061 for "Predictive Light Field Compression", filed Apr. 15, 2015, the disclosure of which is incorporated herein by reference in its entirety.

U.S. Utility application Ser. No. 15/085,048 also claims priority as a continuation-in-part of U.S. Utility application Ser. No. 14/261,144 for "Compression of Light Field Images", filed Apr. 24, 2014, the disclosure of which is incorporated herein by reference in its entirety.

TECHNICAL FIELD

The present disclosure relates to systems and methods for storing light-field image data, and more specifically, to systems and methods for compressing light-field data to reduce the space required to store light-field images.

BACKGROUND

A light-field contains all the spatial and angular visual information of a scene and can enable various applications. However, the four-dimensional (4D) nature of the light-field significantly increases data size. In order to enable projection of the light-field data to generate final two-dimensional (2D) images of sufficient quality, the required size of the light-field is usually orders of magnitude larger than that of a 2D image. Therefore, high-performance light-field compression is a crucial technique for the light-field processing system.

In theory, the light-field data is highly redundant and compressible. However, in practice, it is difficult to exploit those redundancies properly from such a high-dimensional signal. Furthermore, the light-field captured by most light-field cameras is often irregularly sampled and highly aliased. Application of traditional image/video compression techniques to compress light-field data often yields unsatisfactory results. One key problem is that existing techniques generally assume the input data is band-limited and has strong correlation in the spatial or frequency domain, but these assumptions do not generally hold true of real light-field data.

SUMMARY

According to the techniques described herein, new systems and methods are used to compress light-field images. In some embodiments, refocus image construction is integrated into the compression process and/or the decompression process. In both a compressor and a decompressor, a refocus image pool may be maintained at different depths, and may be used to predict the light-field.

In at least one embodiment, the system uses and improves on traditional image/video compression standards. Raw light-field data may be processed block-by-block. For each block, the compressor may generate predictions from all refocus images and may choose the best one according to factors such as prediction error and cost (storage size). After the best prediction is chosen, the system may further compress the residual, which may be much sparser and more compressible.

After a block is encoded, its reconstructed version may then be used to update the refocus images and progressively improve the predictive power of those images. The same procedure may be performed at the decompressor for consistency.

This method may have many advantages, which may include, but are not limited to, the following:

- No per-pixel depth estimation is required in the compression or decompression process.
- One or more arbitrary four-dimensional sampling grids may be used in each block.
- The block-wise process is fully compatible with common image and/or video compression standards.
- The process time, memory access pattern, and bandwidth for compressing and decompressing each block is regular, and therefore suitable for hardware implementation such as implementation in ASIC or the like.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DEFINITIONS

Figure 1:
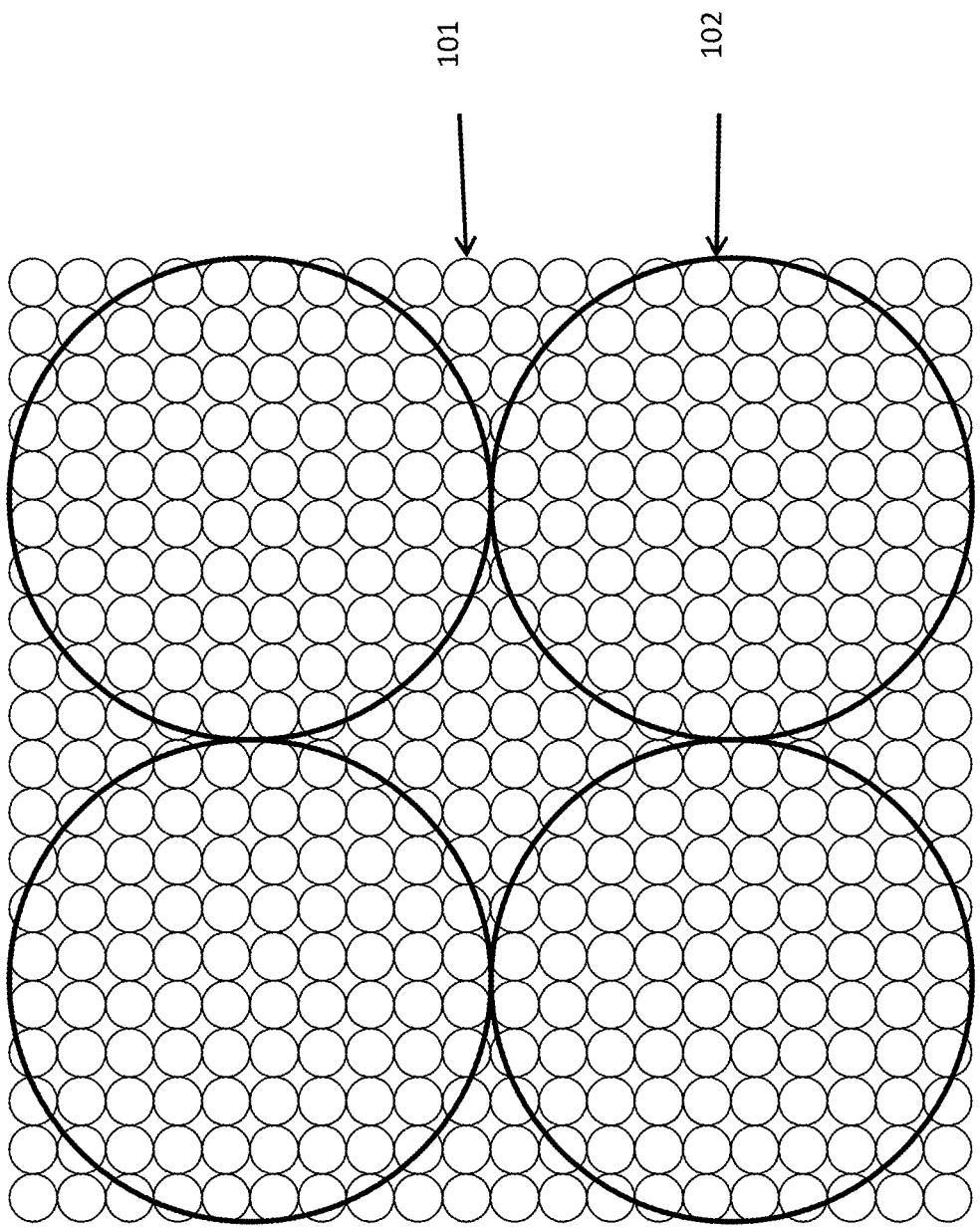
FIG. 1 depicts a portion of a light-field image.

For purposes of the description provided herein, the following definitions are used:

Bitstream: the binary data generated by the compression. All information required to reconstruct the data in the decompression process may be included in the bitstream.

Compress, compressor, or compression: the process and/or algorithm by which digital data is converted into a different form of smaller size. A lossy compression process can distort the data, while a lossless compression process introduces no distortion.

Data store: a hardware element that provides volatile or nonvolatile digital data storage.

Decompress, decompressor, or decompression: the process and/or algorithm by which compressed data is converted back to its original representation that can be used in applications designed for the original data. The decompressed data may not be identical to the data prior to compression if the compression process is lossy.

Disk: a region in a light-field image that is illuminated by light passing through a single microlens; may be circular or any other suitable shape.

Extended depth of field (EDOF) image: an image that has been processed to have objects in focus along a greater depth range.

Four-dimensional coordinate, or 4D coordinate: The coordinates (x, y, u, v) used to index the light-field sample. (x, y) may be referred to as the spatial coordinate and (u, v) may be referred to as the angular coordinate. In a light-field camera, (x, y) is the coordinate of the intersection point of a light ray with the microlens array, and (u, v) is that with the aperture plane.

H.264: a popular video compression standard, as set forth, for example, at https://en.wikipedia.org/wiki/H.264/MPEG-4_AVC and http://www.itu.int/rec/T-REC-H.264.

HEVC: High Efficiency Video Encoding, which is a successor of H.264, as set forth, for example, at http://hevc.info/ and https://en.wikipedia.org/wiki/High_Efficiency_Video_Coding.

Image: a two-dimensional array of pixel values, or pixels, each specifying a color.

Image sensor, or photosensor: a sensor that produces electrical signals in proportion to light received.

JPEG: a popular still image compression standard, as set forth, for example, at https://en.wikipedia.org/wiki/JPEG and http://www.w3.org/Graphics/JPEG/itu-t81.pdf.

Light-field, or light-field data: four-dimensional data, such as a sample representing information carried by ray bundles captured by a light-field camera or other capture device. Each ray may be indexed by a four-dimensional coordinate (for example, x, y, u, v). This document focuses on digital light-fields captured by a single light-field camera, with all samples arranged in a two-dimensional array as on their layout on a photosensor.

Light-field image: an image that contains a representation of light-field data captured at the sensor.

Microlens: a small lens, typically one in an array of similar microlenses.

Microlens array: a pattern of microlenses.

Reconstructed data: the data recovered by the decompression process. Reconstructed data may be different from the original source data due to the potential distortion caused by a lossy compression process.

Refocus image: a two-dimensional image reconstructed from a light-field. Some regions of the refocus image may be in focus, while others may be blurry.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

Figure 2:
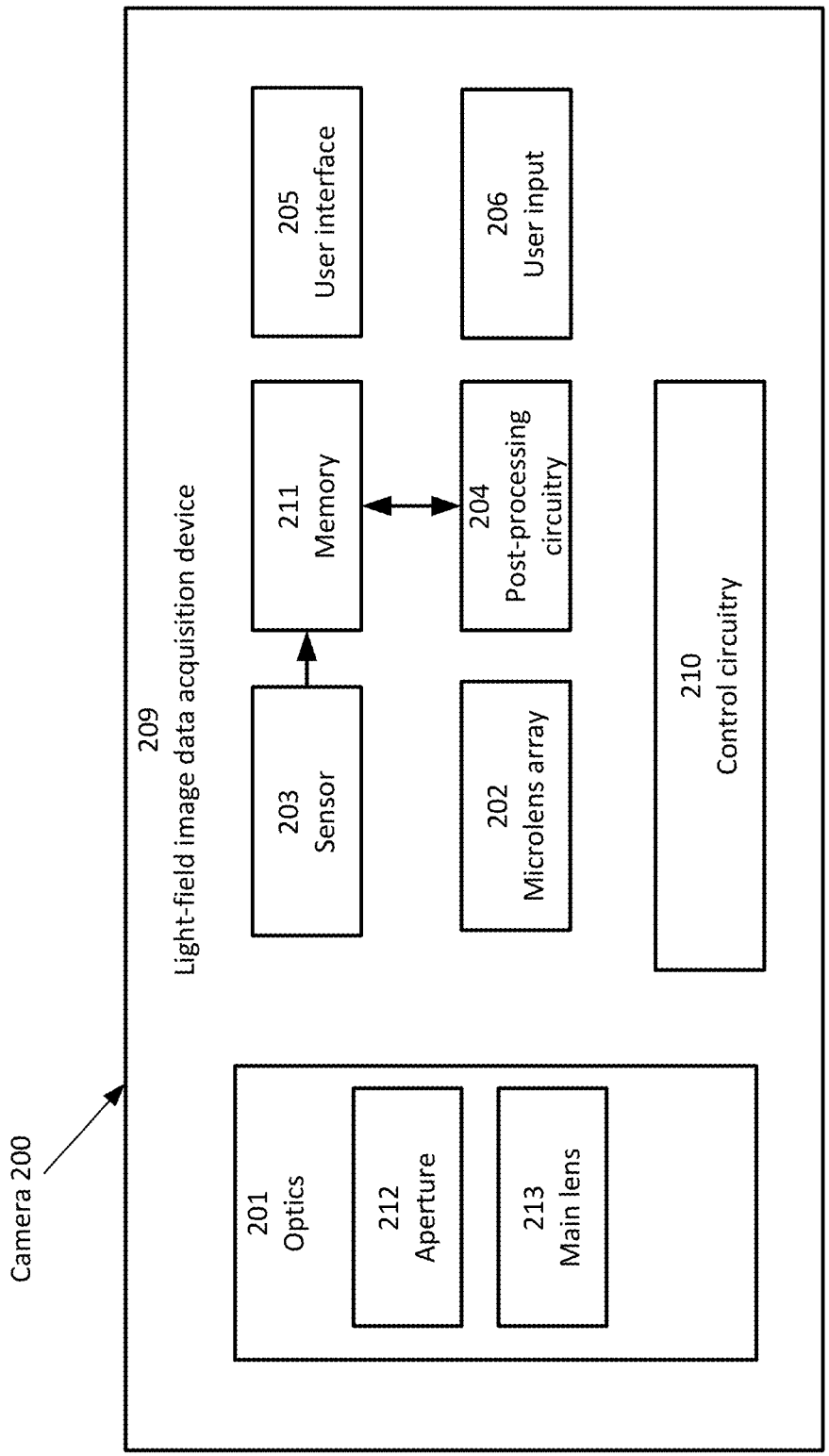
FIG. 2 depicts an example of an architecture for implementing the methods of the present disclosure in a light-field capture device, according to one embodiment.
Figure 3:
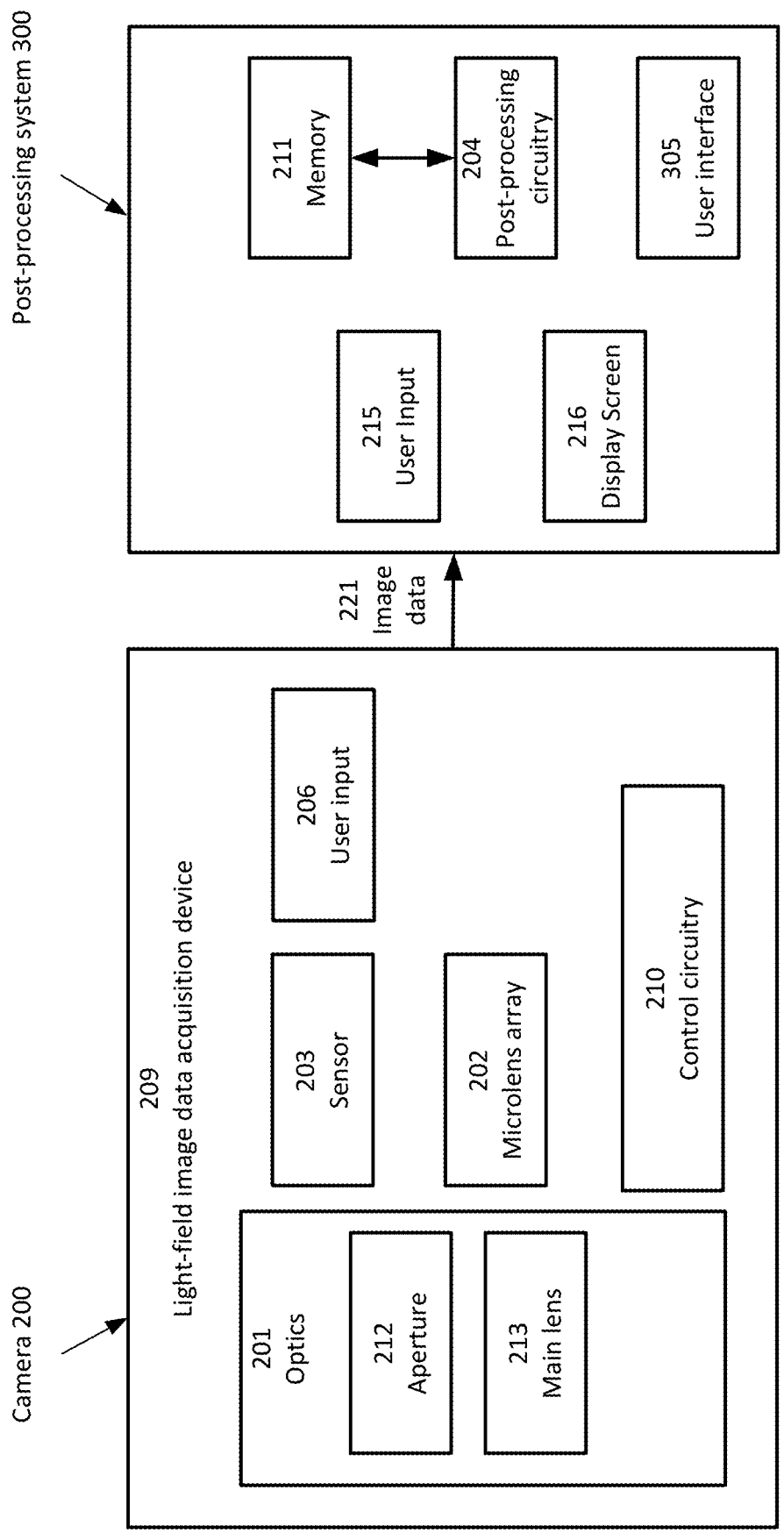
FIG. 3 depicts an example of an architecture for implementing the methods of the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 2, there is shown a block diagram depicting an architecture for implementing the method of the present disclosure in a light-field capture device such as a camera 200. Referring now also to FIG. 3, there is shown a block diagram depicting an architecture for implementing the method of the present disclosure in a post-processing system 300 communicatively coupled to a light-field capture device such as a camera 200, according to one embodiment. One skilled in the art will recognize that the particular configurations shown in FIGS. 2 and 3 are merely exemplary, and that other architectures are possible for camera 200. One skilled in the art will further recognize that several of the components shown in the configurations of FIGS. 2 and 3 are optional, and may be omitted or reconfigured.

Figure 4:
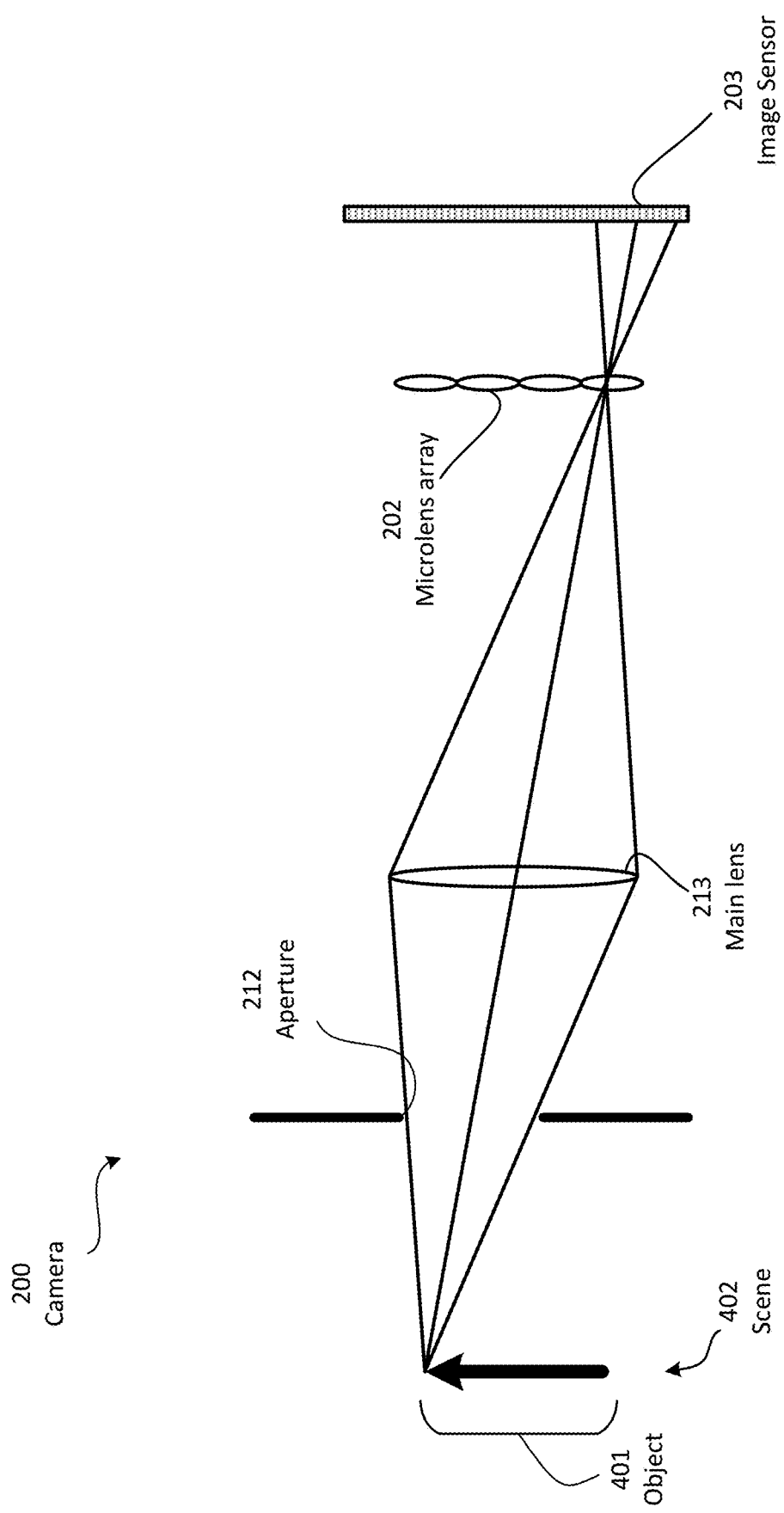
FIG. 4 depicts an example of an architecture for a light-field camera for implementing the methods of the present disclosure according to one embodiment.

In at least one embodiment, camera 200 may be a light-field camera that includes light-field image data acquisition device 209 having optics 201, image sensor 203 (including a plurality of individual sensors for capturing pixels), and microlens array 202. Optics 201 may include, for example, aperture 212 for allowing a selectable amount of light into camera 200, and main lens 213 for focusing light toward microlens array 202. In at least one embodiment, microlens array 202 may be disposed and/or incorporated in the optical path of camera 200 (between main lens 213 and image sensor 203) so as to facilitate acquisition, capture, sampling of, recording, and/or obtaining light-field image data via image sensor 203. Referring now also to FIG. 4, there is shown an example of an architecture for a light-field camera, or camera 200, for implementing the method of the present disclosure according to one embodiment. The Figure is not shown to scale. FIG. 4 shows, in conceptual form, the relationship between aperture 212, main lens 213, microlens array 202, and image sensor 203, as such components interact to capture light-field data for one or more objects, represented by an object 401, which may be part of a scene 402.

In at least one embodiment, camera 200 may also include a user interface 205 for allowing a user to provide input for controlling the operation of camera 200 for capturing, acquiring, storing, and/or processing image data. The user interface 205 may receive user input from the user via an input device 206, which may include any one or more user input mechanisms known in the art. For example, the input device 206 may include one or more buttons, switches, touch screens, gesture interpretation devices, pointing devices, and/or the like.

Similarly, in at least one embodiment, post-processing system 300 may include a user interface 305 that allows the user to initiate processing, viewing, and/or other output of light-field images. The user interface 305 may additionally or alternatively facilitate the receipt of user input from the user to establish one or more parameters of subsequent image processing.

In at least one embodiment, camera 200 may also include control circuitry 210 for facilitating acquisition, sampling, recording, and/or obtaining light-field image data. For example, control circuitry 210 may manage and/or control (automatically or in response to user input) the acquisition timing, rate of acquisition, sampling, capturing, recording, and/or obtaining of light-field image data.

In at least one embodiment, camera 200 may include memory 211 for storing image data, such as output by image sensor 203. Such memory 211 can include external and/or internal memory. In at least one embodiment, memory 211 can be provided at a separate device and/or location from camera 200.

For example, camera 200 may store raw light-field image data, as output by image sensor 203, and/or a representation thereof, such as a compressed image data file. In addition, as described in related U.S. Utility application Ser. No. 12/703,367 for "Light-field Camera Image, File and Configuration Data, and Method of Using, Storing and Communicating Same," filed Feb. 10, 2010 and incorporated herein by reference in its entirety, memory 211 can also store data representing the characteristics, parameters, and/or configurations (collectively "configuration data") of device 209. The configuration data may include light-field image capture parameters such as zoom and focus settings.

In at least one embodiment, captured image data is provided to post-processing circuitry 204. The post-processing circuitry 204 may be disposed in or integrated into light-field image data acquisition device 209, as shown in FIG. 2, or it may be in a separate component external to light-field image data acquisition device 209, as shown in FIG. 3. Such separate component may be local or remote with respect to light-field image data acquisition device 209. Any suitable wired or wireless protocol can be used for transmitting image data 221 to circuitry 204; for example, the camera 200 can transmit image data 221 and/or other data via the Internet, a cellular data network, a Wi-Fi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input 215 and/or a display screen 216. If desired, light-field image data may be displayed for the user on the display screen 216.

Overview

Light-field images often include a plurality of projections (which may be circular or of other shapes) of aperture 212 of camera 200, each projection taken from a different vantage point on the camera's focal plane. The light-field image may be captured on image sensor 203. The interposition of microlens array 202 between main lens 213 and image sensor 203 causes images of aperture 212 to be formed on image sensor 203, each microlens in microlens array 202 projecting a small image of main-lens aperture 212 onto image sensor 203. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 200 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 1, there is shown an example of a 2-disk by 2-disk portion of such a light-field image, including depictions of disks 102 and individual pixels 101; for illustrative purposes, each disk 102 is ten pixels 101 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light Field Image Processing," filed Feb. 22, 2013 and issued on Sep. 9, 2014 as U.S. Pat. No. 8,831,377, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Any number of image processing techniques can be used to reduce color artifacts, reduce projection artifacts, increase dynamic range, and/or otherwise improve image quality. Examples of such techniques, including for example modulation, demodulation, and demosaicing, are described in related U.S. application Ser. No. 13/774,925 for "Compensating for Sensor Saturation and Microlens Modulation During Light Field Image Processing", filed Feb. 22, 2013 and issued on Feb. 3, 2015 as U.S. Pat. No. 8,948,545, the disclosure of which is incorporated herein by reference in its entirety.

Light-Field Image Compression and Decompression

Top-Level Overview

Figure 5:
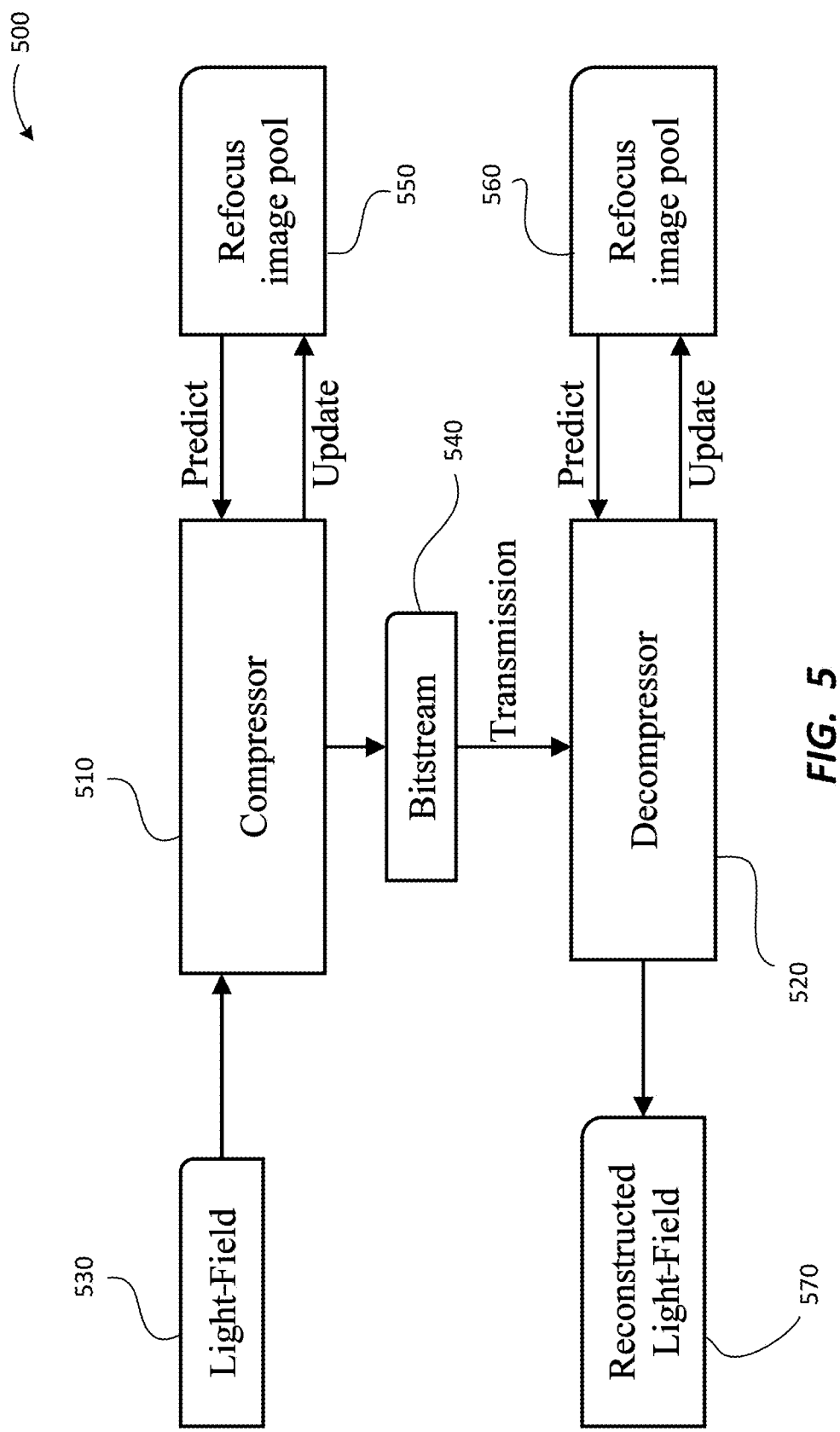
FIG. 5 is a top-level system diagram for implementing an improved light-field compression/decompression system, according to one embodiment.

FIG. 5 depicts a top-level system diagram for implementing an improved light-field compression/decompression system, or system 500, according to one embodiment. The system 500 may include a compressor 510 and a decompressor 520. The input to the compressor 510 may be a light-field image such as a raw light-field image taken by the light-field camera 200, or light-field 530. The output may be a binary bitstream, or bitstream 540, of the light-field 530 in compressed form. The decompressor 520 may generate a reconstructed version of the light-field 530, which is shown as a reconstructed light-field image, or reconstructed light-field 570.

One key difference between the system 500 and more traditional image compression/decompression systems may be that both the compressor 510 and the decompressor 520 may manage a pool of refocus images, shown as a refocus image pool 550 for the compressor 510, and a refocus image pool 560 for the decompressor 520. As compression proceeds, the refocus image pool 550 may be progressively updated and may serve as a source to predict the light-field signal to be compressed. Similarly, as decompression proceeds, the refocus image pool 560 may be progressively updated and may serve as a source to predict the light-field signal to be decompressed. Thus, each of the refocus image pool 550 and the refocus image pool 560 may be used to facilitate a predict operation, and may be the subject of an update operation.

Once generated, the bitstream 540 may be much smaller than the original light-field 530, and can be easily stored and/or transmitted. When an application needs to process the light-field 530, the bitstream 540 may be fed into the decompressor 520. The decompressor 520 may manage the refocus image pool 560. The refocus image pool 560 may be updated progressively in the decompression process, and may be used to provide predictive data to facilitate reconstruction of the light-field 530.

In FIG. 5, the decompressor 520 and the compressor 510 may be displaced from each other, and may even be hosted on separate devices. The bitstream 540 may be the only information shared between the two devices. Thus, the bitstream 540 may optionally be transmitted to the decompressor 520, as indicated by the word "transmission" in FIG. 5. However, such transmission is an optional part of the system and method; in some embodiments, the compressor 510 and the decompressor 520 may be hosted on the same device, thus obviating the need to transmit the bitstream 540 outside the device. The device(s) that host the compressor 510 and/or the decompressor 520 may be any computing device, including but not limited to the camera 200 of FIG. 2, and the post-processing system 300 of FIG. 3.

Figure 6:
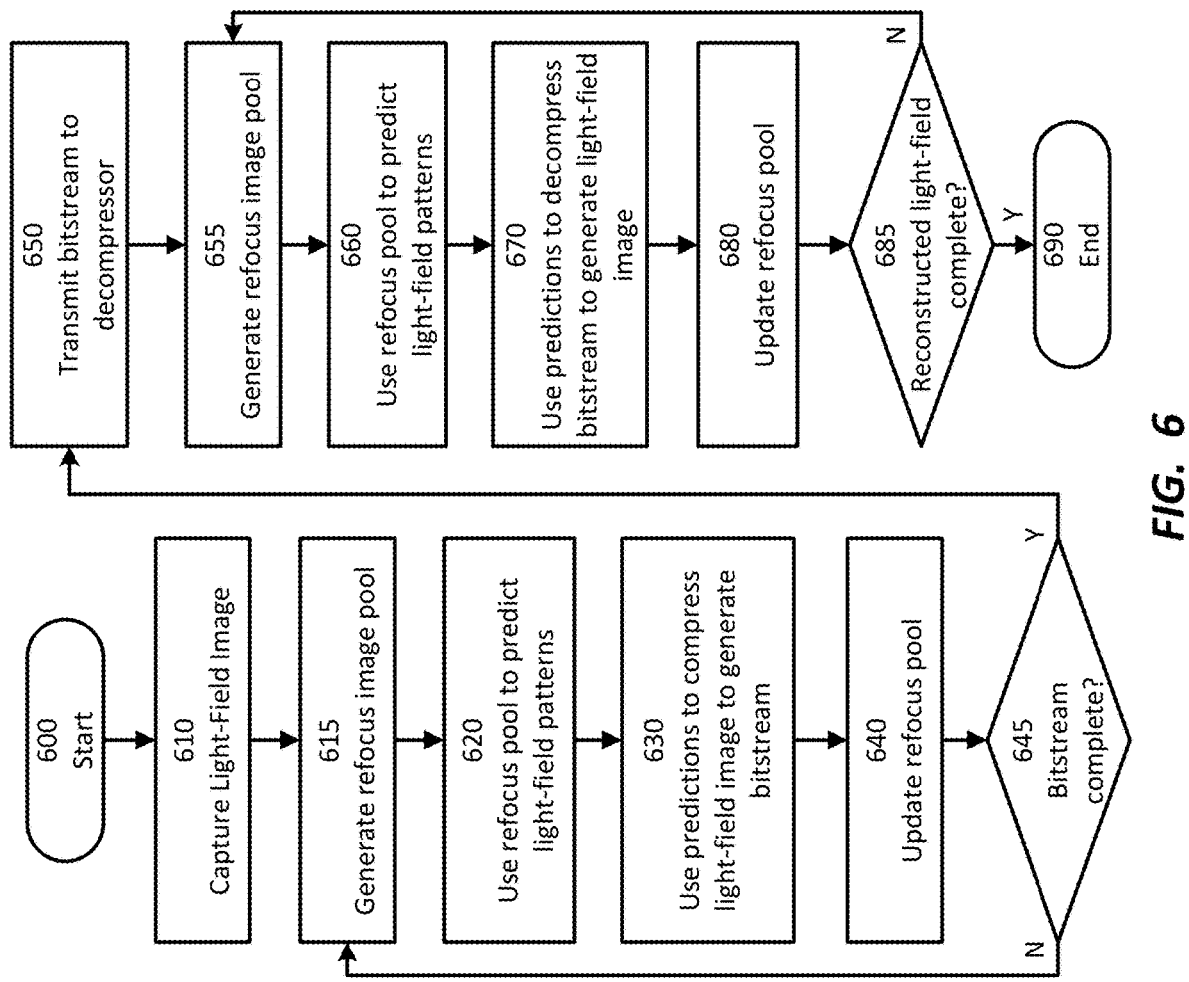
FIG. 6 is a process flow diagram depicting a compression method, according to one embodiment.

FIG. 6 is a process flow diagram illustrating a method of carrying out image compression and decompression, according to one embodiment. The method of FIG. 6 may be carried out through the use of the system 500 of FIG. 5, or alternatively, through the use of a differently configured compression and/or decompression system. Similarly, the system 500 of FIG. 5 may be used to implement the method of FIG. 6, or a different compression and/or decompression method.

The method may start 600 with a step 610 in which a light-field image, or the light-field 530 of FIG. 5, is captured, for example, by the camera 200 of FIG. 2. Alternatively, the method can be applied to previously captured and/or stored light-field image data. The light-field image may be stored, prior to compression, in raw format or the like. In a step 615, the refocus image pool to be used in compression (i.e., the refocus image pool 550 of FIG. 5) may be generated. This may be done by projecting the light-field 530 onto one or more planes, as will be discussed subsequently.

In a step 620, the refocus image pool 550 may be used to predict light-field patterns in the light-field 530. This step may be carried out block-by-block, after dividing the light-field 530 into a plurality of blocks, which may be divided from each other based on spatial coordinates. Thus, the refocus image pool 550 may be used to provide guidance as to the contents of the compressed block that will most closely represent each block of the light-field 530.

In a step 630, the predictions obtained in the step 620 may be used to compress the light-field 530 to generate the bitstream 540. Specifically, the compressed blocks referenced previously may be combined to provide the bitstream 540. In a step 640, the refocus image pool 550 may be updated to reflect the results of the predictive analysis carried out in the step 620. This updating process may enhance the results of further compression operations. Comparison of a reconstructed version of each block with the original block from the light-field 530 may facilitate this process so that the compression quality improves as each successive block is compressed.

In a query 645, a determination may be made as to whether the bitstream 540 is complete. As indicated previously, the bitstream 540 may be constructed block-by-block. If all of the blocks of the bitstream 540 have not been completed, the method may re-iterate the step 615, the step 620, the step 630, and/or the step 640 (for example, for each block) until all blocks of the bitstream 540 have been completed. Then, the bitstream 540 may be stored and/or decoded at the desired time, commencing with a step 650.

The bitstream 540 may be significantly smaller than the light-field 530, and may thus be more easily stored, transmitted to a different computing device, or the like. The bitstream 540 may advantageously be decompressed for viewing and/or manipulation. Thus, in further steps, the bitstream 540 may be decompressed to provide the reconstructed light-field 570.

In a step 650, the bitstream 540 may be transmitted to the decompressor 520. As indicated previously, the decompressor 520 may optionally be hosted on a computing device different from that of the compressor 510. In a step 655, the refocus image pool 560 used by the decompressor 520 may be generated. The refocus image pool 560 may be generated in a manner similar to that of the refocus image pool 550, which will be set forth in greater detail below.

In a step 660, the refocus image pool 560 may be used to predict light-field patterns in the bitstream 540, and hence, in the reconstructed light-field 570. Like the step 620, the step 660 may be carried out block-by-block, after dividing the reconstructed light-field 570 into a plurality of blocks, which may be divided from each other based on spatial coordinates. Thus, the refocus image pool 560 may be used to provide guidance as to the contents of the reconstructed block that is likely to most closely represent each block of the light-field 530.

In a step 670, the predictions obtained in the step 660 may be used to decompress the bitstream 540 to generate the reconstructed light-field 570. Specifically, the reconstructed blocks referenced previously may be combined to provide the reconstructed light-field 570. In a step 680, the refocus image pool 560 may be updated to reflect the results of the predictive analysis carried out in the step 660. This updating process may enhance the results of further decompression operations. Comparison of each reconstructed block with the original block from the light-field 530, or with the corresponding block of the bitstream 540, may facilitate this process so that the decompression quality improves as each successive block is reconstructed.

In a query 685, a determination may be made as to whether the reconstructed light-field 570 is complete. As indicated previously, the reconstructed light-field 570 may be constructed block-by-block. If all of the blocks of the reconstructed light-field 570 have not been completed, the method may re-iterate the step 655, the step 660, the step 670, and/or the step 680 (for example, for each block) until all blocks of the reconstructed light-field 685 have been completed. Then, the reconstructed light-field 685 may be viewed and/or processed as desired. The method may then end 690.

The reconstructed light-field 570 may be larger than the bitstream 540. Thus, the reconstructed light-field 570 may not be as suitable for storage or transmission, but may facilitate viewing and/or further manipulation operations. The reconstructed light-field 570 may provide a suitable, lossy approximation of the light-field 530 captured originally.

Refocus Image Pool

Refocus image pools 550 and 560 may each be an array of refocus images created from the (partially reconstructed) light-field 530. Many methods are available for generating a refocus image from a light-field, including but not limited to those described in related U.S. application Ser. No. 13/688, 026 for "Extended Depth of Field and Variable Center of Perspective in Light-Field Processing", filed February Nov. 28, 2012 and issued on Aug. 19, 2014 as U.S. Pat. No. 8,811,769, the disclosure of which is incorporated herein by reference in its entirety.

In at least one embodiment, the system generates the refocus images of the refocus image pool 550 and/or the refocus image pool 560 by focusing the light-field 530 at a specific plane. By doing this, the system 500 may avoid the scene geometry/depth estimation process entirely. Avoiding such depth-based processes may be advantageous because they may require significant time and/or computing power on the device that hosts the compressor 510. The refocus image pool 550 may be referenced by and/or updated by the compressor 510, and the refocus image pool 560 may be referenced by and/or updated by the decompressor 520.

In at least one embodiment, the system 500 uses the refocus images in the refocus image pool 550 and/or the refocus image pool 560 for predicting the light-field 530. The quality of the prediction may depend on a few key parameters, which may include, but are not limited to:

1. Whether the depth range of refocus images covers the entire scene; and
2. Whether the refocus images contain the fine details of the scene.

Number two above may be very important, since the light-field 530 is not bandlimited to the Nyquist sampling rate of the light-field camera 200 (that is, the density of the microlens array 202). Therefore, in at least one embodiment, the resolution of the refocus images of the refocus image pool 550 and/or the refocus image pool 560 is set to a level higher than the bandwidth of the light-field 530. The predict operation and the update operation may thus preserve the details of the refocus images up to the specified resolution.

For the following discussion, it is assumed that the refocus image pool 550 and the refocus image pool 560 each contain N refocus images, and the depth of each of the refocus images properly spans the depth range of the scene. Parameters can be adjusted as desired, to trade off memory, processing time, compression quality, and/or system complexity.

Decompressor

Figure 7:
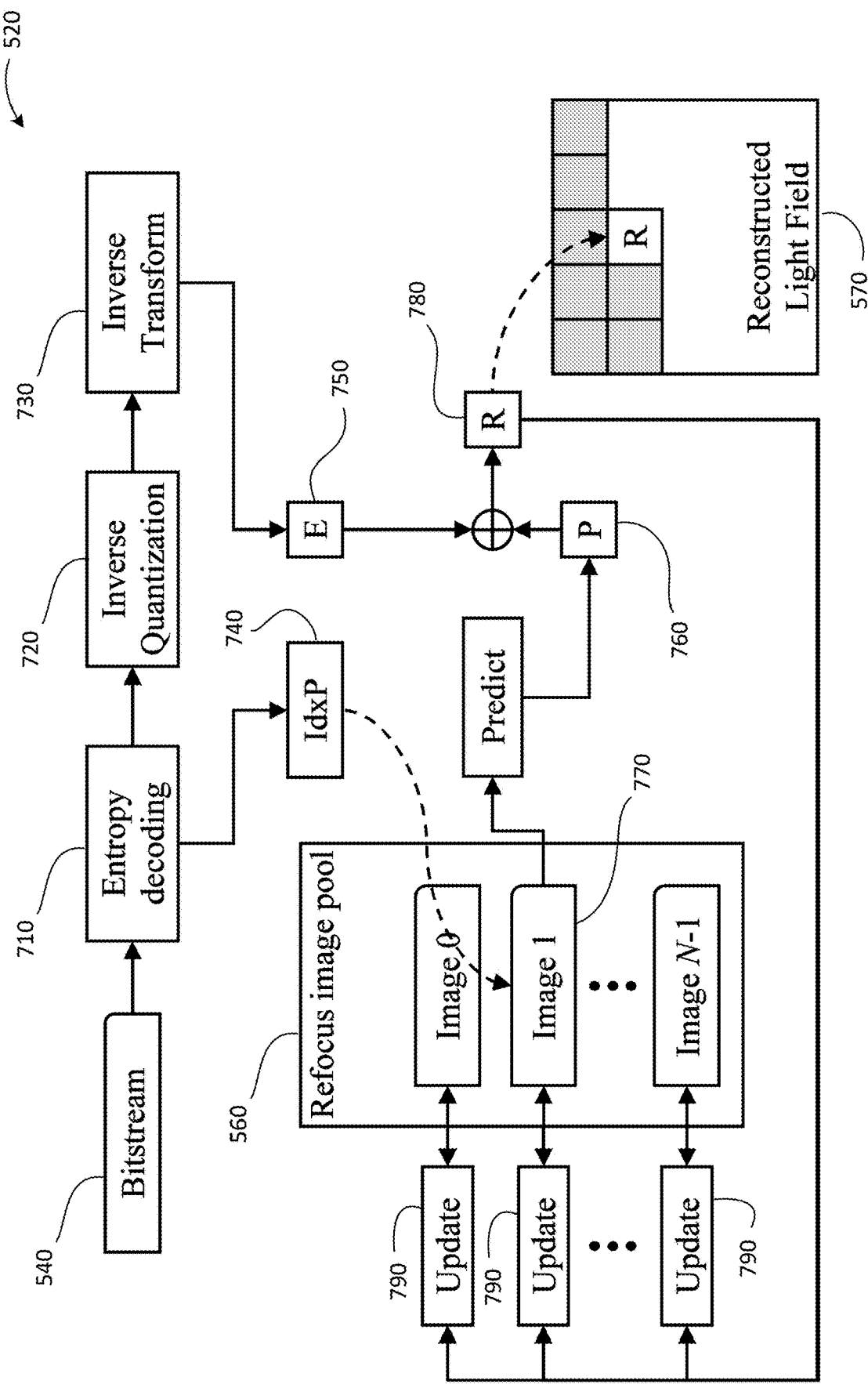
FIG. 7 is a system diagram of a decompressor according to one embodiment.

FIG. 7 is a system diagram depicting the decompressor 520 of FIG. 5, according to one embodiment. The input to the decompressor 520 may be the bitstream 540, and the final output may be the reconstructed light-field 570. The decompressor 520 may reconstruct the light-field 530 block-by-block to provide the reconstructed light-field 570. Each constructed block may also be used to update the refocus image pool 560 referenced by the decompressor 520.

In at least one embodiment, at the beginning of the decompression process, all values in the refocus image pool 560 are set to zero. In other embodiments, other initial conditions can be used. The decompression process may be carried out through the use of an entropy decoding module 710, an inverse quantization module 720, and an inverse transform module 730.

First, the entropy decoding module 710 may take a variable length of data from the bitstream 540, until (1) the prediction index 740 of the refocus image for prediction (IdxP in FIG. 7) is derived, and (2) the coefficients required by the inverse transform module 730 are derived. In at least one embodiment, the decompressor 520 uses known techniques for the entropy decoding module 710 (and the corresponding encoding process in the compressor 510). Such techniques may include, but are not limited to, Huffman coding, run-length coding, arithmetic coding, and the like.

Next, if data was quantized by the compressor 510, the decompressor 520 may reverse that process through the use of the inverse quantization module 720. Because quantization causes bit truncation, the inverse quantization module 720 cannot perfectly recover the signal, so the compression system may be lossy. Quantization and inverse quantization are well-established techniques, and many methods in the image/video compression standards can be used here.

If the signal was transformed by the compressor 510 into another space before quantization, the decompressor 520 may reverse that process through the use of the inverse transform module 730. Such signal transformations and reverse transformations may be performed according to a variety of well-established techniques. Popular transforms include, but are not limited to, discrete cosine transform, wavelet, and Fourier transform.

After entropy decoding, inverse quantization, and inverse transform, an error block 750 may be recovered. Also, a prediction block 760 may be generated from the refocus image of index IdxP (for example, IdxP is 1 in FIG. 7, as indicated by the arrow from IdxP to the first refocus image 770 of the refocus image pool 560). There are many ways to generate the prediction block 760; the main principle is to re-image the refocus image (for example, the first refocus image 770 referenced previously) as a surface at a known depth through the light-field camera 200. In at least one embodiment, the decompressor 520 uses an inverse projection method. One example of an inverse projection method is described by the pseudo-code in Algorithm 1, below:

---

Algorithm 1: InverseProjection

---

Input: idxP, refocusImages, blockIdx, blockSize
Output: P
1    Set all pixels in P to zero
2    Set l = refocusImages[idxP].depth
3    For y in [0, blockSize−1]
4        For x in [0, blockSize−1]
5            coord4D = Compute4DCoordinate(blockIdx, x, y)
6            s = coord4D.x − l*coord4D.u
7            t = coord4D.y − l*coord4D.v
8            P(x,y) = refocusImages[idxP].lookup(s,t)
9    Normalize and fill the missing samples in P

---

Algorithm 1 takes the prediction index 740 (idxP), the refocus images in the refocus image pool 560 (refocusImages), the index of the current processing block (blockIdx)

and the size of the block (blockSize) as input. It first sets the output block to zero and fetches the depth value of the refocus image (l). For each pixel in the block, it computes the corresponding four-dimensional light-field coordinate (Compute4DCoordinate), the two-dimensional projection coordinate to the depth of the refocus image ([l]), and then fetches the pixel value from the refocus image (the lookup function). Note that the depth value has been mapped to simplify the calculation of the projection coordinate (lines 6 and 7) in this implementation. The four-dimensional light-field coordinate may be implemented as set forth in U.S. patent application Ser. No. 13/774,971 for "Compensating for Variation in Microlens Position During Light Field Image Processing," filed Feb. 22, 2013 and issued on Sep. 9, 2014 as U.S. Pat. No. 8,831,377, the disclosure of which is incorporated herein by reference in its entirety.

Because the refocus image pool 560 is partially created and updated during the decompression process, lookup may not always return reliable values. Samples deemed to be unreliable can be labeled and cleaned up at the end using simple interpolation.

Finally, the reconstructed block 780 may be created as the combination of the prediction block 760 and the decompressed error block 750 (R=P+E). The reconstruction block 780 may be inserted into the reconstructed light-field 570 and this block may also be used to update the refocus image pool 560. In at least one embodiment, the decompressor 520 may use a projection method, as described by the pseudocode set forth in Algorithm 2, below:

---
Algorithm 2: Projection
---
Input: R, refocusImages, blockIdx, blockSize, N
Output: refocusImages
1.    For y in [0, blockSize−1]
2.        For x in [0, blockSize−1]
3.            coord4D = Compute4DCoordinate(blockIdx, x, y)
4.            val = R(x,y)
5.            For i in [0, N−1]
6.                l = refocusImages[i].depth
7.                s = coord4D.x − l*coord4D.u
8.                t = coord4D.x − l*coord4D.u
9.                refocusImages[i].update(s, t, val)

The structure of Algorithm 2 is very similar to inverse projection. For each sample in the reconstructed block, the algorithm computes its four-dimensional coordinate. Then, it goes through all refocus images in the refocus image pool 560 and computes the projection coordinate for each one. Finally, refocusImages[i].update takes the reconstructed pixel (val) to update the pixels in refocusImages[i] around the projection coordinate (s and t) (Note: not necessarily only the nearest one). In at least one embodiment, update does not simply overwrite the pixel values in the refocus images, but can blend with the existing values in the image, which can further improve the quality of the prediction. This is why refocusImages is both input and output.

Based on reconstruction block 780, updates 790 are applied to the refocus images in the refocus image pool 560. Then, the decompressor 520 may continue to decompress the next block. In at least one embodiment, the entropy decoding module 710, the inverse quantization module 720, and the inverse transform module 730 can operate in parallel with application of the updates 790. After all blocks are reconstructed, the decompression is complete, and the reconstructed light-field 570 may also be complete.

Compressor

Figure 8:
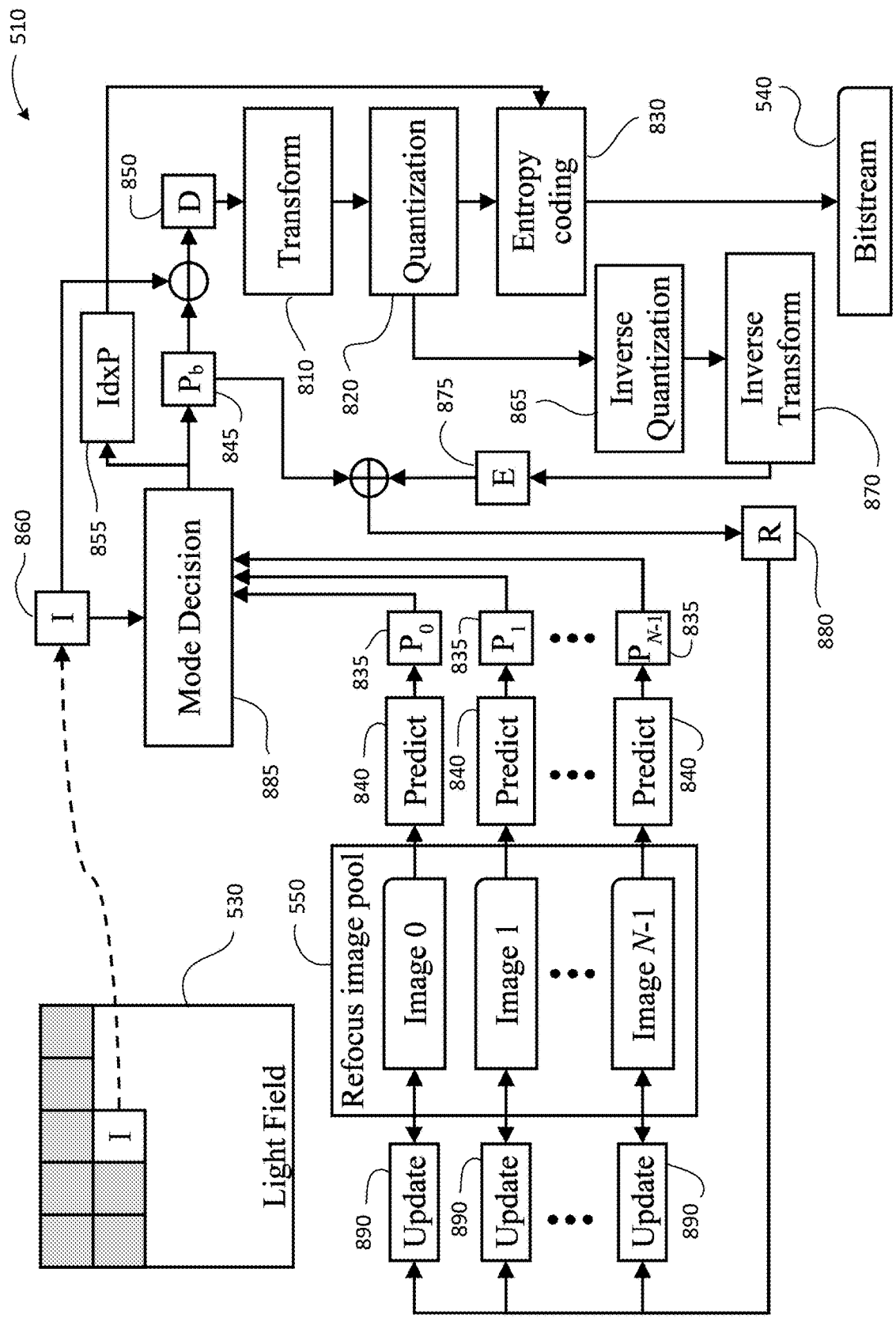
FIG. 8 is a system diagram of a compressor according to one embodiment.

In at least one embodiment, the compressor 510 generates the bitstream 540 for the decompressor 520 described above. FIG. 8 is a system diagram depicting the compressor 510 according to one embodiment.

In at least one embodiment, at the beginning of the compression process, all values in the refocus images of the refocus image pool 550 are set to zero. In other embodiments, other initial conditions can be used. The compression process may be carried out through the use of a transform module 810, a quantization module 820, and an entropy coding module 830.

The input light-field, i.e., the light-field 530 of FIG. 5, may be compressed block-by-block. Here, however, the best prediction for the new block (I) may not be known a priori. Therefore, in at least one embodiment, the compressor 510 first generates predictions 835 from all refocus images ($P_0$, $P_1$, ... $P_{N-1}$) of the refocus image pool 550, using a predict operation 840 to generate predictions 835, and then picks the best prediction block 845 ($P_b$). Again, in at least one embodiment, in the first pass, all refocus images of the refocus image pool 550 contain zero values. The selection process is called mode decision, and the decision accuracy can affect the compression quality significantly. Any suitable methodology can be used for mode decision, as described in more detail below.

After the best prediction block 845 is chosen, the compressor 510 may compute the residual of the prediction as a distortion block 850 ($D=I-P_b$). The compressor 510 may then transform and quantize the block as a normal image domain through the use of the transform module 810 and the quantization module 820, respectively. After those steps, the transformed and quantized coefficients, combined with a prediction index 855 (IdxP) is converted to the bitstream 540 by entropy coding via the entropy coding module 830. As described above with respect to the decompressor 520, these techniques are well-known in other contexts, and any of a number of techniques and implementations can be used.

As in the decompressor 520, updates 890 may be applied to the refocus images of the refocus image pool 550 so that the incoming blocks can have better predictions. In at least one embodiment, application of the updates 890 may be done in a manner consistent with that of the decompressor 520, so that the decompression process does not drift due to a mismatch in generation of the prediction blocks 835 (P). Therefore, in at least one embodiment, the input block 860 (I) is not used to update the refocus images of the refocus image pool 550. Instead, the compressor 510 may apply an inverse quantization, via an inverse quantization module 865, and an inverse transform, via an inverse transform module 870 to get the decompressed error block 875 (E). The compressor 510 may combine the decompressed error block 875 (E) with the prediction blocks 835 (P) to obtain the reconstructed block 880 (R) for updating the refocus images of the refocus image pool 550. These steps may be identical to the corresponding steps described previously in connection with the decompressor 520.

Mode Decision Methods

Mode decision may be carried out by a mode decision module 885. The goal of mode decision may be to choose the best prediction block 845 among all possible predictions 835. This can be formulated as an objective minimization problem, and the different objectives can lead to different solutions. In various embodiments, any of the following three mode decision methods can be used; alternatively, other methods can be used, involving other objectives.

The first method is called least-distortion-error selection, as described in the pseudo-code for Algorithm 3, as follows:

Algorithm 3: LeastDistortionErrorSelection

```
Input: I, P[ ], N
Output: IdxP, Pbest
   1.      IdxP = -1, minError = infinity
   2.      For i in [0, N-1]
   3.           D[i] = I - P[i]
   4.           error = sum(abs(Di))
   5.           If error < minError
   6.                minError = error
   7.                IdxP = i
   8.      Pbest = P[IdxP]
```

The least-distortion-error selection algorithm operates as follows: for each prediction block 835 (P[i], as $P_i$ in FIG. 8), a distortion block 850 (D[i]) is computed and the error is defined as the sum of the absolute values in the prediction block 835. The prediction block 835 with minimal error is chosen as the best prediction block 845 (Pbest, as $P_b$ in FIG. 8).

The second method is called least-reconstruction-error selection, as described in the pseudo-code for Algorithm 4, as follows:

Algorithm 4: LeastReconstructionErrorSelection

```
Input: I, P[ ], N
Output: IdxP, Pbest
   1.      IdxP = -1, minError = infinity
   2.      For i in [0, N-1]
   3.           D[i] = I - P[i]
   4.           TQD[i] = Quantize(Transform(D[i]))
   5.           E[i] = InverseTransform(InverseQuantize(TQD[i]))
   6.           error = sum(abs(I - (E[i] + P[i])))
   7.           If error < minError
   8.                minError = error
   9.                IdxP = i
  10.      Pbest = P[IdxP]
  11.
```

In Algorithm 4, the error for each prediction block 835 is measured by the difference between the reconstruction block 880 (E[i]+P[i]) and the input block 860. To compute the reconstruction block 880, the compressor 510 may first compute the error block 875. This may be achieved by using the transform module 810 (Transform), the quantization module 820 (Quantize), the inverse quantization module 865 (InverseQuantize), and then the inverse transform module 870 (InverseTransform) to apply the corresponding operations to the distortion block 850. While this method may involve more computation, the measured error may have a better correlation to the quality of the reconstructed light-field 570.

The final method is called minimal-rate-distortion selection, as described in the pseudo-code for Algorithm 5, as follows:

Algorithm 5: MinimalRateDistortionSelection

```
Input: I, P[ ], N, rateWeight
Output: IdxP, Pbest
   1.      IdxP = -1, minRDCost = infinity
   2.      For i in [0, N-1]
   3.           D[i] = I - P[i]
   4.           TQD[i] = Quantize(Transform(D[i]))
   5.           E[i] = InverseTransform(InverseQuantize(TQD[i]))
```

-continued

Algorithm 5: MinimalRateDistortionSelection

```
   6.           error = sum(abs(I - (E[i] + P[i])))
   7.           rate = size(EntropyCoding(TQD[i], i))
   8.           RDCost = error + rateWeight * rate
   9.           If RDCost < minRDCost
  10.                minRDCost = RDCost
  11.                IdxP = i
  12.      Pbest = P[IdxP]
  13.
```

In Algorithm 5, besides the error of the prediction or reconstruction (error), the amount of data after compression is also taken into account. This is because a mode with better reconstruction quality may also cause the bitstream 540 generated to have a larger size, and some balance between the quality and the size of the bitstream 540 should be made. Here, the size of the bitstream 540 is called rate, and can only be measured after the entropy coding (EntropyCoding) to the transformed-and-quantized error block 875 (TQD[i]) is performed. This may involve more computation, but may also provide the best result. The weighting of the rate against the error, rateWeight, is an adjustable parameter and can be set manually or from a training dataset.

Integration with Existing Systems

In at least one embodiment, the system and method described herein are implemented in a manner that is hardware-friendly. In some implementations, the system may be easy to parallelize. Further, the system and method may be compatible with existing standards. The transform, inverse transform, quantization, inverse quantization, entropy coding, and/or entropy decoding operations described above can be implemented using well-known techniques such as JPEG, H.264, and/or HEVC.

In at least one embodiment, the system generates a bitstream (for example, the bitstream 540 of FIG. 5) wherein the only additional information for each block is the prediction index 855 (IdxP). Therefore, only a minimal change to the entropy coding module 830 and/or entropy decoding module 710 may be needed. The refocus image pool management, the predict operation and the update operations can all be implemented independently of existing components.

In addition, the system can be fully integrated into implementations of existing image/video standards, so as to further improve performance. For example, more inputs can be added to the mode decision module 885, including, for example, the quantization parameter. Such inputs may help enable the mode decision module 885 to choose the best quantization step automatically. In at least one embodiment, a built-in bitrate control system can be used to prevent buffer overflow.

Finally, in at least one embodiment, the system can include additional prediction methods available in various standards, as parallel input to the mode decision module 885. For example, in H.264, the intra-prediction for a block is generated by smoothly propagating the pixels of previously reconstructed blocks, for example, as described at http://www.itu.int/rec/T-REC-H.264.

Further Details

There is no constraint on the distribution of the light-field coordinates in a block. However, in at least one embodiment, Compute4DCoordinate is implemented in both the compressor 510 and the decompressor 520.

The color space of the light-field or the blocks during the processing is not constrained. The proposed system and method can be used for both monochrome light-fields and color light-fields, and the sampling density of each color channel can be different as in other image/video compression algorithms, as long as the update and predict operations can be defined.

The block size can be arbitrary. In at least one embodiment, the system is implemented so as to use components from existing implementations and/or standards; accordingly, the block size can be chosen so as to follow the constraints in those systems. For example, in JPEG compression, the block size is 16×16. In H.264 and HEVC, the block size is more flexible, and a large block can be sub-divided into smaller ones recursively. In various embodiments, the system and method can be configured to work together with such systems, as long as the update and predict operations for all block sizes can be implemented.

In mode decision, one important calculation is the error of a block of pixels. In the algorithms described above, the simple sum of absolute values (sum(abs(.))) is used. However, in other embodiments, more complex metrics can be used, such as the sum of squared values or a metric that is highly correlated to the perceptual image quality.

It is possible that no prediction is good enough for a block (determined mode decision process). In this case, the predict operation and combination process can be skipped in both the compressor 510 and the decompressor 520 (that is, P=0, D=I, and E=R); however, the update operation may still be carried out.

For computational efficiency, some prediction blocks for certain refocus images can be skipped when they are not likely to be chosen. This "prediction of prediction" can be made by analyzing the statistics of previously compressed blocks.

The compression order of the blocks in a light-field is not limited. While sequential scans from top-left to bottom-right can be used, as depicted above, other techniques can be employed. For example, all blocks at odd rows can be compressed first, and then all blocks at even rows. In this way, even-row blocks can have better predictions. Such techniques may help to provide more uniform image quality of the reconstructed light-field 570 by distributing use of higher-quality predictions relatively evenly across the reconstructed light-field 570.

Extension to Light-Field Videos

Figure 9:
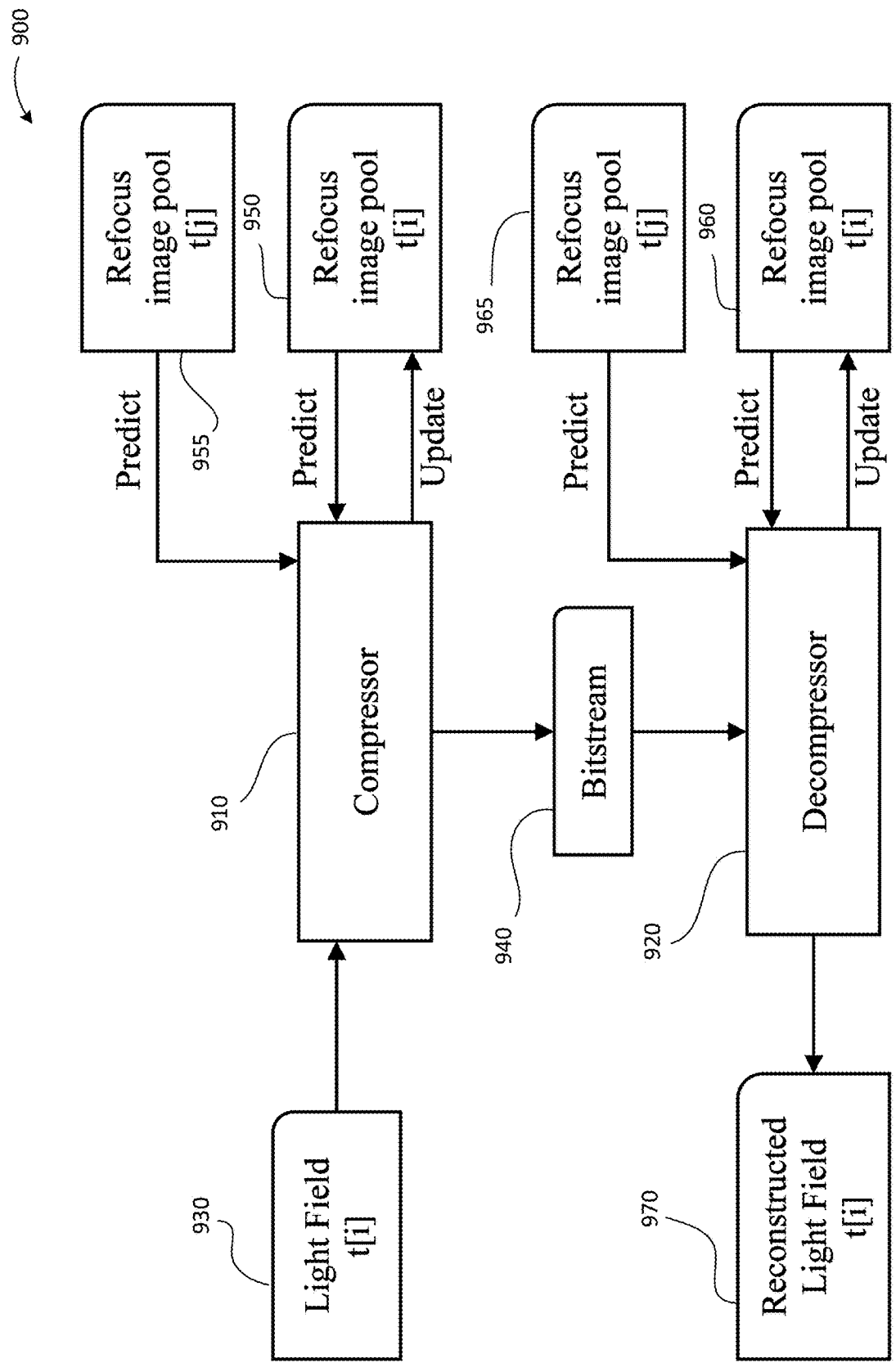
FIG. 9 is a system diagram illustrating extension of the compression systems and methods set forth previously to light-field video, according to one embodiment.

The techniques described herein can be extended to facilitate compression and/or decompression of light-field video. One example of such an extended system is shown in FIG. 9. The system 900 may compress light-field video having light-fields 930 through the use of a compressor 910 to generate a bitstream 940. The bitstream 940 may be decompressed via a decompressor 920 to generate reconstructed light-field video, which may have reconstructed light-fields 970. As in the system 500 of FIG. 5, the compressor 910 and the decompressor 920 may be hosted on the same hardware, or on different devices. Thus, prior to decompression, the bitstream 940 may optionally be transmitted to a different device than that which performed the compression. As discussed in connection with compression and decompression of light-field images, compression and/or decompression of light-field video may be performed on any computing device, including but not limited to the camera 200 of FIG. 2 and the post-processing system 300 of FIG. 3.

In the arrangement of FIG. 9, each of a plurality of light-fields 930 and refocus image pools 950 and 960 may be associated with a unique timestamp t[i]. Instead of one refocus image pool, the compressor 910 and the decompressor 920 may now maintain multiple refocus image pools, including one for the current frame and ones from reconstructed frames. Thus, for example, a refocus image pool 950 and a refocus image pool 955 may both be associated with the compressor 910, while a refocus image pool 960 and a refocus image pool 965 may be associated with the decompressor 920.

Note that no temporal continuity or causality need be enforced. Thus, t[j] can be larger or smaller than t[i]. During the compression or decompression process, the prediction can come from any refocus image in existing refocus image pools. However, in at least one embodiment, only the refocus image pool for the current light-field (for example, the refocus image pool 950 or the refocus image pool 955) can be updated by the reconstructed blocks.

To generate the useful prediction from the refocus image pool of other timestamps (for example, the refocus image pool 955 and the refocus image pool 965, both of which may be at the time stamp t[j]), the motion between the light-fields may be taken into account. Therefore, the prediction parameters may now include the time index (t[i]), the prediction image index (idxP), and/or the motion parameters. The dimension of the motion parameters can affect the prediction accuracy, but two-dimensional translational motion may be enough for small blocks in smooth videos.

Specifically, when prediction blocks are generated from the refocus image pools with different timestamps, each prediction block may have three parameters (idxP, mx, and my), where (mx, my) is the 2D motion vector. If the predict operation is implemented by the inverse projection algorithm (Algorithm 1), it may be modified as follows:

| Algorithm 6: MotionCompensatedInverseProjection |
| --- |
| Input: idxP, mx, my, refocusImages, blockIdx, blockSize |
| Output: P |
| 1    Set all pixels in P to zero |
| 2    Set l = refocusImages[idxP].depth |
| 3    For y in [0, blockSize−1] |
| 4        For x in [0, blockSize−1] |
| 5            coord4D = Compute4DCoordinate(blockIdx, x, y) |
| 6            s = coord4D.x − l*coord4D.u + mx |
| 7            t = coord4D.y − l*coord4D.v + my |
| 8            P(x,y) = refocusImages[idxP].lookup(s,t) |
| 9    Normalize and fill the missing samples in P |

The main difference between Algorithm 6 and Algorithm 1 may be that the projected coordinate (s and t) may, in Algorithm 6, be offset by (mx and my). At the compressor 910, the best motion vector may be searched among possible ones and decided by the mode decision operation. In at least one embodiment, motion along the z-axis may not be stored, as it may be implicitly represented by IdxP.

Finally, in cases where memory or storage is constrained, and refocus image pools of all light-fields cannot be held, some form of memory management may be implemented. For example, in at least one embodiment, techniques similar to frame buffer management systems in a video compression standard are used.

Results

Figure 10B:
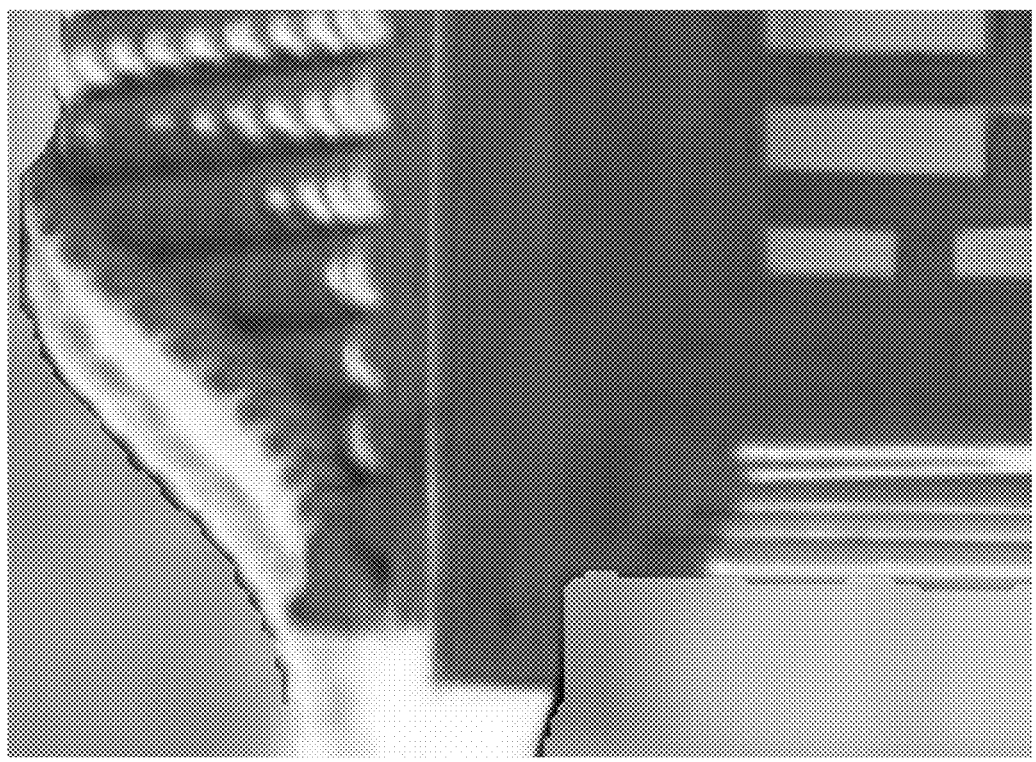
FIGS. 10A and 10B are zoomed-in portions of exemplary refocus images from light-field images compressed through the use of the systems and methods set forth herein, and through the use of previously available systems and methods, respectively.
Figure 10A:
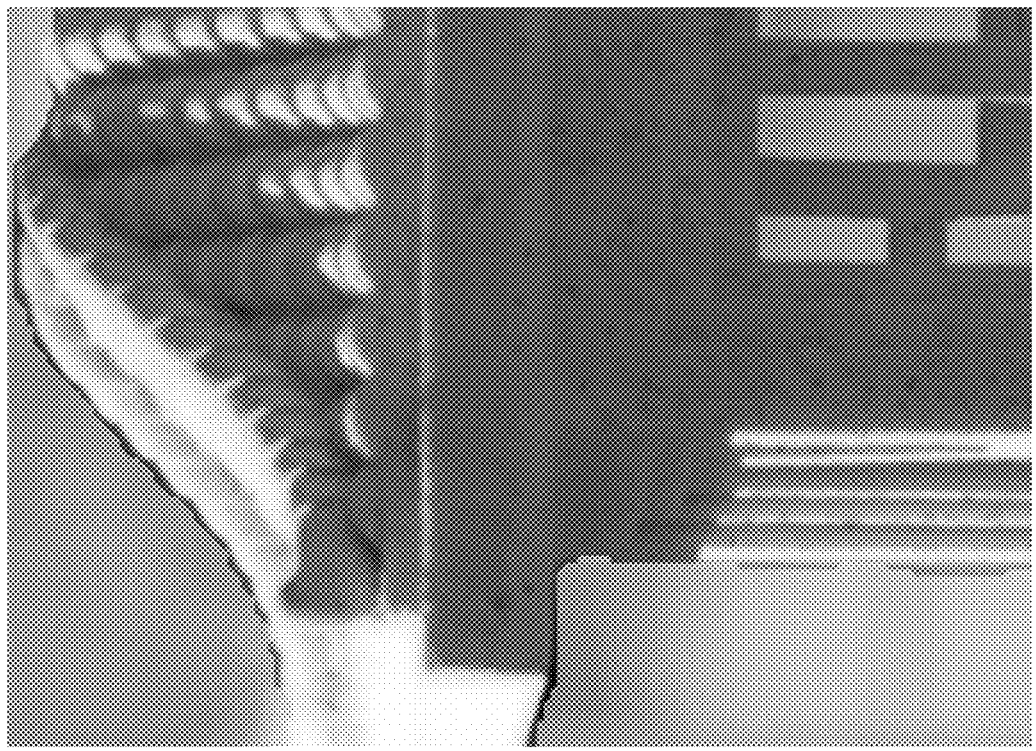

The techniques described herein may provide results in which details above the spatial sampling rate of the light-field camera can be accurately predicted and preserved after compression. For example, FIGS. 10A and 10B depict refocus images 1000, 1050 that are generated via the method described herein (FIG. 10A) and via a previous method (FIG. 10B). The sizes of the compressed light-fields may be nearly identical; however, comparison of the refocus image 1000 with the refocus image 1050 shows that the method described herein preserves more details.

Figure 11:
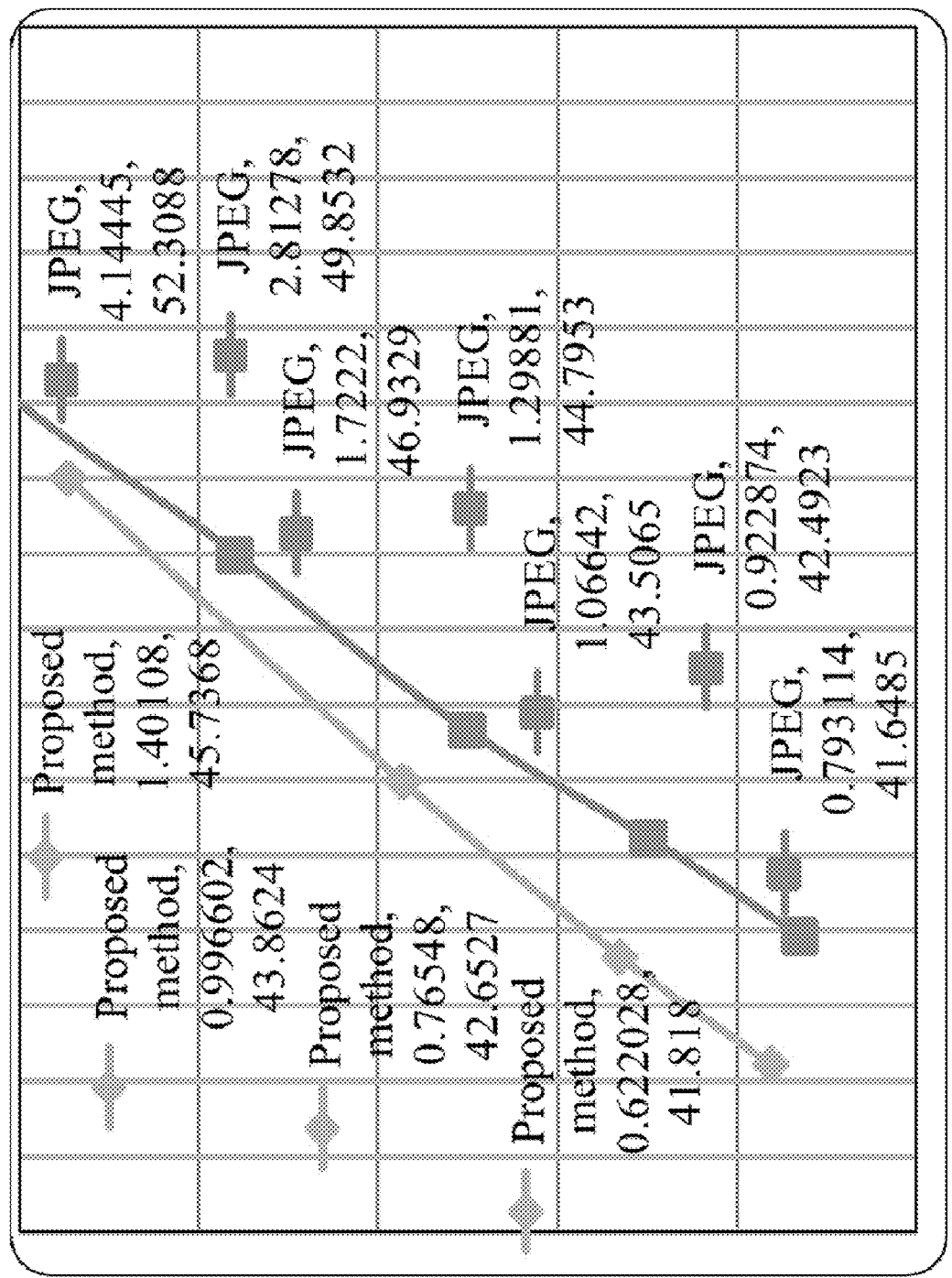
FIG. 11 is a plot illustrating exemplary results of the systems and methods set forth herein, compared with those obtained with traditional JPEG compression.

To quantitatively analyze the performance of a compression algorithm, the algorithm may be set at various compression rates. The quality of each compression result may then be measured. In FIG. 11, a plot 1100 illustrates the results of the described method, plotted alongside the results obtained with traditional JPEG compression that treats the input light-field as a regular two-dimensional image. In FIG. 11, peak-signal-to-noise-ratio (PSNR) is used as the quality metric on the vertical axis, although any other metric can be used. The required bits-per-sample is shown on the horizontal axis as an indicator of the space required for the compressed light-field image. For a non-compressed light-field image, the bits-per-sample value is 24.0, for reference.

As can be seen from FIG. 11, at a given level of quality, the system and method presented herein can save an additional 25% bitrate over conventional JPEG compression; alternatively, keeping bitrate the same, the system and method set forth herein may provide a quality improvement of approximately 1 dB to 2.5 dB over conventional JPEG compression.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for manipulating a light-field image, the method comprising:
   in a data store, receiving the light-field image after the light-field image has been captured by a light-field image capture device;
   in a processor, generating a first refocus image pool comprising a plurality of refocus images based on the light-field image, the plurality of refocus images comprising two-dimensional (2D) images reconstructed from the light-field image by projecting the light-field image to be focused at one or more focal planes; and
   in the processor, using the first refocus image pool to compress the light-field image to generate a bitstream that is representative of the light-field image.

2. The method of claim 1, wherein using the first refocus image pool to compress the light-field image comprises:
   dividing the light-field image into a plurality of blocks;
   for each of the blocks, using the first refocus image pool to generate a compressed block; and
   combining the compressed blocks to generate the bitstream.

3. The method of claim 2, wherein using the first refocus image pool to generate the compressed block comprises applying at least one selection from the group consisting of transformation, quantization, and entropy encoding.

4. The method of claim 1, wherein the light-field image comprises a first light-field image from a first time index in light-field video, the method further comprising:
   in the data store, receiving a second light-field image from a second time index in the light-field video; and
   in the processor, generating a second refocus image pool comprising a second plurality of refocus images based on the second light-field image;
   wherein using the first refocus image pool to compress the light-field image to generate the bitstream further comprises using the second refocus image pool to facilitate generation of the bitstream.

5. The method of claim 1, further comprising:
   in one of the data store and a second data store, receiving the bitstream;
   in one of the processor and a second processor, generating a second refocus image pool comprising a second plurality of refocus images based on the bitstream; and
   in one of the processor and the second processor, using the second refocus image pool to decompress the bitstream to generate a reconstructed light-field image, larger than the bitstream, that is representative of the light-field image.

6. The method of claim 1, wherein the light-field image capture device comprises a plenoptic light-field camera comprising an image sensor and a microlens array.

7. A method for generating a reconstructed light-field image, the method comprising:
   in a data store, receiving a bitstream generated by compressing a light-field image;
   in a processor, generating a refocus image pool comprising a plurality of refocus images based on the bitstream, the plurality of refocus images comprising two-dimensional (2D) images reconstructed from the bitstream to be focused at one or more focal planes; and
   in the processor, using the refocus image pool to decompress the bitstream to generate the reconstructed light-field image such that the reconstructed light-field image is larger than the bitstream and is representative of the light-field image.

8. The method of claim 7, wherein using the refocus image pool to decompress the bitstream comprises:
   dividing the bitstream into a plurality of blocks;
   for each of the blocks, using the refocus image pool to generate a reconstructed block; and
   combining the reconstructed blocks to generate the reconstructed light-field image.

9. The method of claim 8, wherein using the refocus image pool to generate the reconstructed block comprises applying at least one selection from the group consisting of inverse transformation, inverse quantization, and entropy decoding.

10. A non-transitory computer-readable medium for manipulating a light-field image, comprising instructions stored thereon, that when executed by a processor, perform the steps of:
   causing a data store to receive the light-field image after the light-field image has been captured by a light-field image capture device;
   generating a first refocus image pool comprising a plurality of refocus images based on the light-field image, the plurality of refocus images comprising two-dimensional (2D) images reconstructed from the light-field image by projecting the light-field image to be focused at one or more focal planes; and
   using the first refocus image pool to compress the light-field image to generate a bitstream that is representative of the light-field image.

11. The non-transitory computer-readable medium of claim 10, wherein using the first refocus image pool to compress the light-field image comprises:
   dividing the light-field image into a plurality of blocks;
   for each of the blocks, using the first refocus image pool to generate a compressed block; and
   combining the compressed blocks to generate the bitstream.

12. The non-transitory computer-readable medium of claim 10, further comprising instructions stored thereon, that when executed by a processor, perform the steps of:
   causing one of the data store and a second data store to receive the bitstream;
   generating a second refocus image pool comprising a second plurality of refocus images based on the bitstream; and
   using the second refocus image pool to decompress the bitstream to generate a reconstructed light-field image, larger than the bitstream, that is representative of the light-field image.

13. A non-transitory computer-readable medium for generating a reconstructed light-field image, comprising instructions stored thereon, that when executed by a processor, perform the steps of:
   causing a data store to receive a bitstream generated by compressing a light-field image;
   generating a refocus image pool comprising a plurality of refocus images based on the bitstream, the plurality of refocus images comprising two-dimensional (2D) images reconstructed from the light-field image by projecting the light-field image to be focused at one or more focal planes; and
   using the refocus image pool to decompress the bitstream to generate the reconstructed light-field image such that the reconstructed light-field image is larger than the bitstream and is representative of the light-field image.

14. The non-transitory computer-readable medium of claim 13, wherein using the refocus image pool to decompress the bitstream comprises:
   dividing the bitstream into a plurality of blocks;
   for each of the blocks, using the refocus image pool to generate a reconstructed block; and
   combining the reconstructed blocks to generate the reconstructed light-field image.

15. A system for manipulating a light-field image, the system comprising:
   a data store configured to receive the light-field image after the light-field image has been captured by a light-field image capture device; and
   a processor, communicatively coupled to the data store, configured to:
      generate a first refocus image pool comprising a plurality of refocus images based on the light-field image, the plurality of refocus images comprising two-dimensional (2D) images reconstructed from the light-field image by projecting the light-field image to be focused at one or more focal planes; and
      use the first refocus image pool to compress the light-field image to generate a bitstream that is representative of the light-field image.

16. The system of claim 15, wherein the processor is configured to use the first refocus image pool to compress the light-field image by:
   dividing the light-field image into a plurality of blocks;
   for each of the blocks, using the first refocus image pool to generate a compressed block; and
   combining the compressed blocks to generate the bitstream.

17. The system of claim 15, wherein:
   the data store or a second data store of the system is configured to receive the bitstream; and
   the processor or a second processor of the system is configured to:
      generate a second refocus image pool comprising a second plurality of refocus images based on the bitstream; and
      use the second refocus image pool to decompress the bitstream to generate a reconstructed light-field image, larger than the bitstream, that is representative of the light-field image.

18. A system for generating a reconstructed light-field image, the system comprising:
   a data store configured to receive a bitstream generated by compressing a light-field image; and
   a processor, communicatively coupled to the data store, configured to:
      generate a refocus image pool comprising a plurality of refocus images based on the bitstream, the plurality of refocus images comprising two-dimensional (2D) images reconstructed from the light-field image by projecting the light-field image to be focused at one or more focal planes; and
      use the refocus image pool to decompress the bitstream to generate the reconstructed light-field image such that the reconstructed light-field image is larger than the bitstream and is representative of the light-field image.

19. The system of claim 18, wherein the processor is configured to use the refocus image pool to decompress the bitstream by:
   dividing the bitstream into a plurality of blocks;
   for each of the blocks, using the refocus image pool to generate a reconstructed block; and
   combining the reconstructed blocks to generate the reconstructed light-field image.

* * * * *